(12) United States Patent
Asher et al.

(10) Patent No.: US 7,605,912 B1
(45) Date of Patent: Oct. 20, 2009

(54) APPLICATION OF STATISTICAL INFERENCE TO OPTICAL TIME DOMAIN REFLECTOMETER DATA

(75) Inventors: Michael Asher, Conyers, GA (US); Hossein Eslambolchi, Los Altos Hills, CA (US); Chuck Giddens, Conyers, GA (US); John Sinclair Huffman, Conyers, GA (US); Harold Stewart, Alpharetta, GA (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 12/157,297

(22) Filed: Jun. 9, 2008

Related U.S. Application Data

(60) Division of application No. 11/879,102, filed on Jul. 16, 2007, now Pat. No. 7,397,545, which is a continuation of application No. 11/434,357, filed on May 15, 2006, now Pat. No. 7,256,878, which is a continuation of application No. 11/263,495, filed on Oct. 31, 2005, now Pat. No. 7,075,632, which is a continuation of application No. 10/897,929, filed on Jul. 23, 2004, now Pat. No. 6,989,893.

(51) Int. Cl.
*G01N 21/00* (2006.01)
(52) U.S. Cl. .................................................. 356/73.1
(58) Field of Classification Search ....................... None
See application file for complete search history.

(56) References Cited

U.S. PATENT DOCUMENTS

| | | | | |
|---|---|---|---|---|
| 5,062,703 | A * | 11/1991 | Wong et al. ................. | 356/73.1 |
| 5,066,118 | A * | 11/1991 | Buerli ........................ | 356/73.1 |
| 6,674,518 | B1 * | 1/2004 | Asher et al. ................. | 356/73.1 |

* cited by examiner

*Primary Examiner*—Michael A Lyons
*Assistant Examiner*—Gordon J Stock, Jr.

(57) ABSTRACT

The present invention relates to a method for interpreting data obtained by measuring a length of optical fiber using an optical time domain reflectometer (OTDR), and comparing that measurement to a reference measurement. The technique uses statistical inference to determine a whether a reference trace is valid by comparing that trace to a more recent test trace. The reference trace may be replaced or an alarm may be transmitted under certain conditions.

10 Claims, 3 Drawing Sheets

APPLICATION OF STATISTICAL INFERENCE TO OPTICAL TIME DOMAIN REFLECTOMETER DATA

CROSS REFERENCE TO RELATED APPLICATIONS

This application is a divisional application of application Ser. No. 11/879,102, entitled "Application of Statistical Inference to Optical Time Domain Reflectometer Data," filed on Jul. 16, 2007, now U.S. Pat. No. 7,397,545, which is a continuation of application Ser. No. 11/434,357, filed on May 15, 2006, now U.S. Pat. No. 7,256,878, which is a continuation of application Ser. No. 11/263,495, filed on Oct. 31, 2005, now U.S. Pat. No. 7,075,632, which is a continuation of application Ser. No. 10/897,929, filed on Jul. 23, 2004, now U.S. Pat. No. 6,989,893.

FIELD OF THE INVENTION

The present invention relates generally to optical network troubleshooting. Specifically, the invention provides a method for interpreting an optical fiber measurement trace taken by an optical time domain reflectometer (OTDR) using statistical inferences.

BACKGROUND OF THE INVENTION

Telecommunications network operators rely heavily on the integrity of their fiber cable networks in competing for customers on the basis of quality of service. Carriers can no longer tolerate service outages on cables, or even single fibers, designed to transport numerous gigabit-per-second optical channels.

Once an optical cable has been installed, network providers must be certain that each separate fiber span matches or exceeds the carrier's specifications. Testing and troubleshooting of in situ optical fiber cable is frequently carried out using optical time domain reflectometer (OTDR) instruments, such as the Series FTB-7000B ODTR sold by EXFO Electro-Optical Engineering Inc. of Vanier (Quebec) Canada.

The OTDR characterizes fibers at a high level of detail, generating distance versus attenuation data, as well as insertion loss measurements for all splices, defects, kinks, and breaks. An OTDR functions by injecting a short, intense laser pulse into the optical fiber and measuring the backscatter and reflection of light as a function of time. A simplified, schematic representation of an OTDR 110 is shown in FIG. 1. The OTDR includes a laser source 116 and a detector 117, each connected to a subject fiber 100 via a coupler 118. Laser energy is injected into the fiber 100 in the form of hundreds of pulses per second. A portion of the laser energy travels to the fiber termination, but splices, breaks, bends and any other anomalies in the fiber reflect some portion of the laser energy. Those characteristics can be located along the fiber by observing the round trip transmission time of the reflected laser energy. The characteristics are measured thousands of times and averaged to increase accuracy.

The reflected light characteristics are analyzed to determine the location of any fiber optic breaks or splice losses. FIG. 2 shows a sample output trace of a typical OTDR. Distance along the fiber cable is represented in kilometers on the x-axis 210, and attenuation 220 of the Laser signal is represented in decibels on the y-axis 212.

Many of the characteristics seen on an OTDR trace are the result of Fresnel reflectance caused by abrupt changes in the index of refraction (ex: glass/air). For example, the mechanical splice connector 221 and span end 223 shown in the trace of FIG. 2 are the result of glass/air interfaces. Using the location of the span end 223 on the x-axis, a length of the fiber span may be accurately calculated. A fusion splice 222 eliminates a glass/air interface, but it nevertheless generates a substantial level of reflected signal power as compared to the backscatter level, and is detectable on the trace. Floor noise 224 may be seen at distances beyond the termination 120 (FIG. 1) of the fiber.

The proper interpretation of OTDR data—whether generated manually or automatically—frequently depends upon its comparison to one or more reference traces. A reference trace, however, is a static snapshot of a fiber that quickly becomes out of date, both from aging characteristics of the optical material, and as a result of network maintenance.

For example, a test OTDR trace may be compared to a reference trace, and the test trace may reveal a shorter overall fiber length than that shown by the reference trace. That situation raises the question whether the shorter fiber length is due to an accidental cable cut, or is due to a cable loop being removed in the course of normal network operations. Similarly, if a test trace displays a higher loss reading, the question arises whether this an equipment fault, or is simply aging of the fiber.

A wide body of tools exists in the industry to analyze a test trace, and to compare that trace to an assumed good reference. However, working in the reverse direction—comparing the reference to the newer test trace—gives a significant advantage to the process.

There is presently a need for a set of statistical tools to increase confidence in the comparison and analysis of OTDR data. Those tools should permit the automatic detection of certain conditions such as:

Reference Trace is invalid and must be updated; and

Reference Trace is valid, but test trace is suspect.

Even if both traces are valid, the toolset should allow additional information to be extracted from the test trace, such as a possible future failure type or failure point.

SUMMARY OF THE INVENTION

The present invention addresses the needs described above with a method for analyzing a measurement of reflective characteristics in an optical fiber. Parameters are received from a test OTDR trace $T_{test}$ of the optical fiber, the parameters including a gross distance measurement $D_{test}$ and at least one array parameter $P[\ ]_{test}$. Parameters from a reference OTDR trace $T_{ref}$ are retrieved from a memory, the parameters including a gross distance measurement $D_{ref}$ and at least one array parameter $P[\ ]_{ref}$. $D_{ref}$ and $D_{test}$ are compared, and if $D_{ref}$ is greater than $D_{test}$, then correlating fiber characteristics represented by $P[\ ]_{ref}$ with fiber characteristics represented by $P[\ ]_{test}$ to determine a location of a portion of fiber represented by $P[\ ]_{ref}$ that is not represented by $P[\ ]_{test}$.

If $D_{ref}$ is less than $D_{test}$, then $D_{ref}$ may be replaced in the memory with $D_{test}$. The step of correlating fiber characteristics may use an inferential statistical method. The inferential statistical method may include performing a chi-squared best fit of the parameter $P[\ ]_{test}$ against the parameter $P[\ ]_{ref}$.

The method may also comprise the step of selecting a significance level $\alpha$ for the correlation of the fiber characteristics.

The parameter $P[\ ]_{test}$ may be an array $R[\ ]$ of reflectance spikes detected along the fiber. If $D_{ref}$ is not statistically significantly greater than or less than $D_{test}$, and a reflectance array $R[\ ]_{test}$ from the test trace $T_{test}$ varies statistically significantly from a reference reflectance array R[ ]$_{ref}$, then D$_{ref}$ may be replaced in the memory with D$_{test}$.

The parameter P[ ]$_{test}$ may be an array IL[ ] of instantaneous loss values measured along the fiber, or may alternatively be an array GL[ ] of gross loss values for points along the fiber.

The step of comparing D$_{ref}$ and D$_{test}$ may comprise the steps of assigning an experimental error a associated with the measurement of D$_{ref}$ and D$_{test}$; if D$_{test}$+2·>D$_{ref}$ then conclude that D$_{test}$ is less than D$_{ref}$; if D$_{test}$>D$_{ref}$+2σ then conclude that D$_{test}$ is greater than D$_{ref}$; and if D$_{test}$<D$_{ref}$<D$_{test}$+2σ then conclude that D$_{test}$ may be equal to D$_{ref}$.

If D$_{ref}$ is less than D$_{test}$, then D$_{ref}$ may be replaced in the memory with D$_{test}$.

In another embodiment of the invention, a machine readable medium is provided containing configuration instructions for performing the above method.

DESCRIPTION OF THE INVENTION

The present invention provides a process for using a test OTDR trace to either validate or refute an assumed good reference trace. The process also allows additional determinations to be made about the validity of the test trace, and to refine error analysis in an alarm situation.

Figure 1:
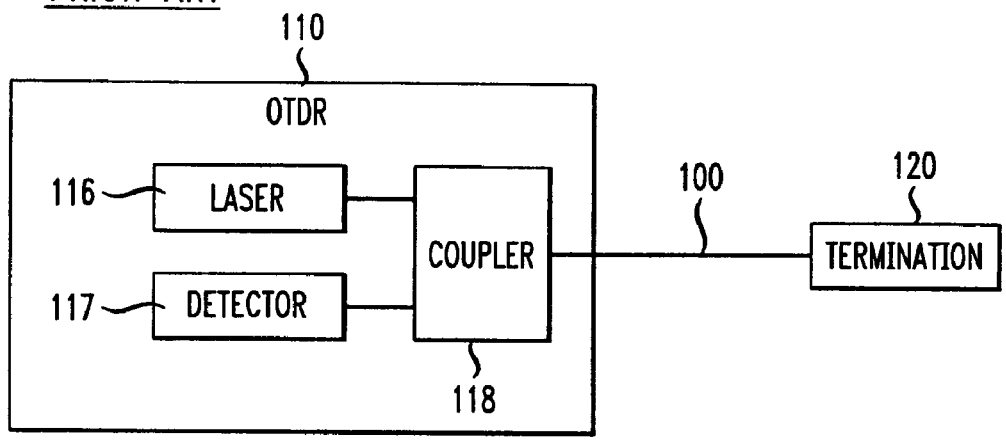
FIG. 1 is a block diagram of an OTDR system connected to a fiber cable.
Figure 3:
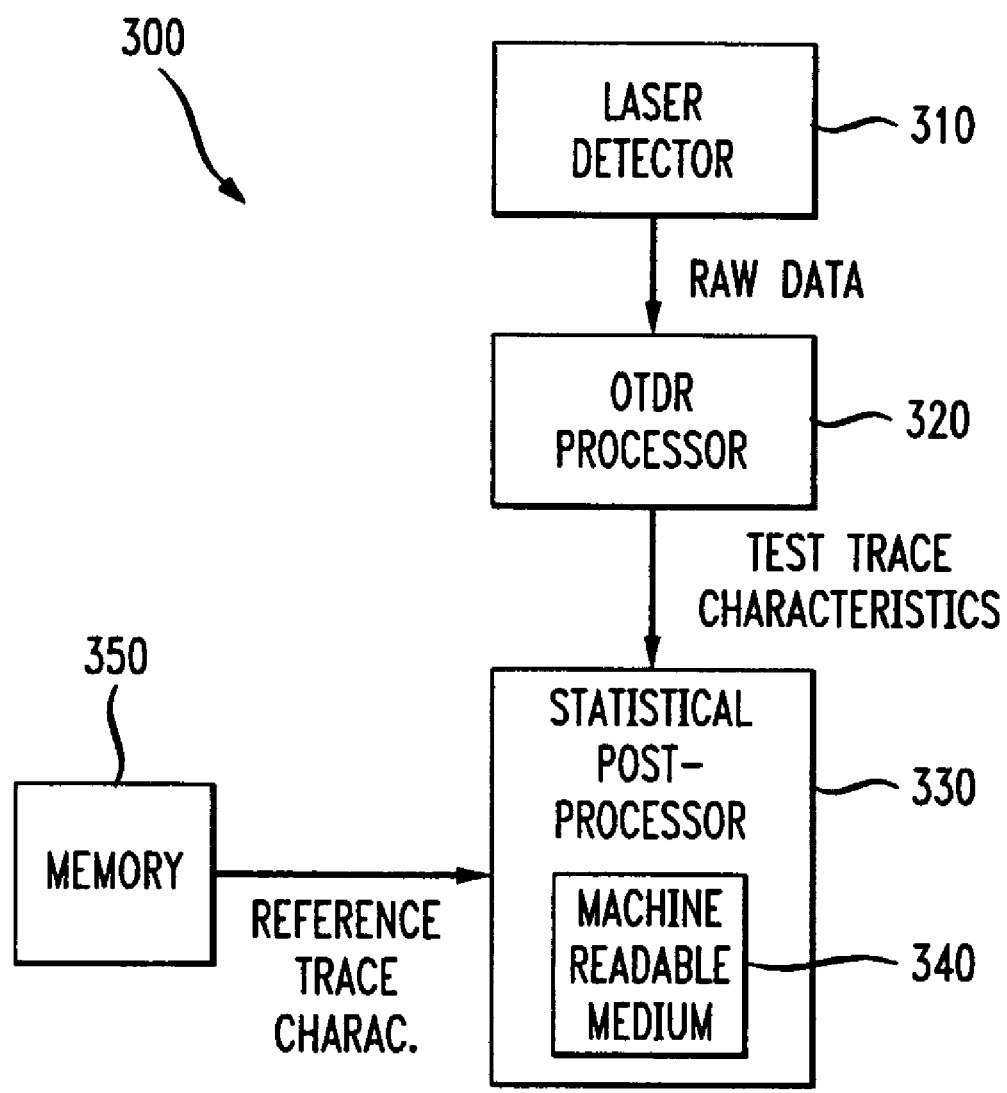
FIG. 3 is a schematic diagram showing a system utilizing one embodiment of the invention.

A block diagram of an exemplary system 300 in accordance with one embodiment of the invention is shown in FIG. 3. Raw measurement data is transmitted from the laser detector 310 to an OTDR processor 320. In one typical OTDR instrument, the processor is integral with the laser detector, the laser and the coupler (FIG. 1) and is programmed to determine fiber characteristics based on the test trace. The OTDR processor 320 may have integral memory (not shown) for storing past measurement results.

Test trace characteristics are transmitted from the OTDR processor 320 to a statistical post-processor 330. The term "statistical post-processor" as used herein does not preclude statistical processing from being performed in the OTDR processor as well. Indeed, the measurement averaging and other statistical functions used in calculating the trace characteristics are typically carried out in the OTDR.

The statistical post-processor 330 may be part of the OTDR processor or may be a separate processor residing, for example, in a desk-top computer. The statistical post-processor 330 has access to a machine readable medium 340 on which are stored instructions that, when executed by the processor, perform the method of the invention. The machine readable medium may be removable media such as an optical disk or magnetic disk, or may be fixed magnetic disk. The medium may alternatively be internal volatile or non-volatile memory.

In executing the process of the invention, the statistical post-processor accesses memory 350 to recall reference trace data or reference test trace characteristics stored on that memory. The memory 350 may reside within the statistical post-processor 330 or within the OTDR processor 320. The reference trace characteristics are used for comparison to the test trace characteristics to detect changes in the fiber.

Certain statistical characteristics of each of the trace data sets are initially computed for the Test trace (T$_{test}$). If those characteristics are not already available for the Reference Trace (T$_{ref}$), then they are computed for that trace as well. For example, the following values may be computed:

D Gross Distance (overall length of the fiber tested)

R[ ] array of Reflectance spikes (inflection points) found along the fiber

GL[ ] array of Gross Loss values for all points along the fiber

IL[ ] array of Instantaneous Loss values (rate of loss) for points along the fiber DV[ ] array Divergence Values between the two traces (IL[ ]$_{ref}$-IL[ ]$_{test}$)

Figure 2:
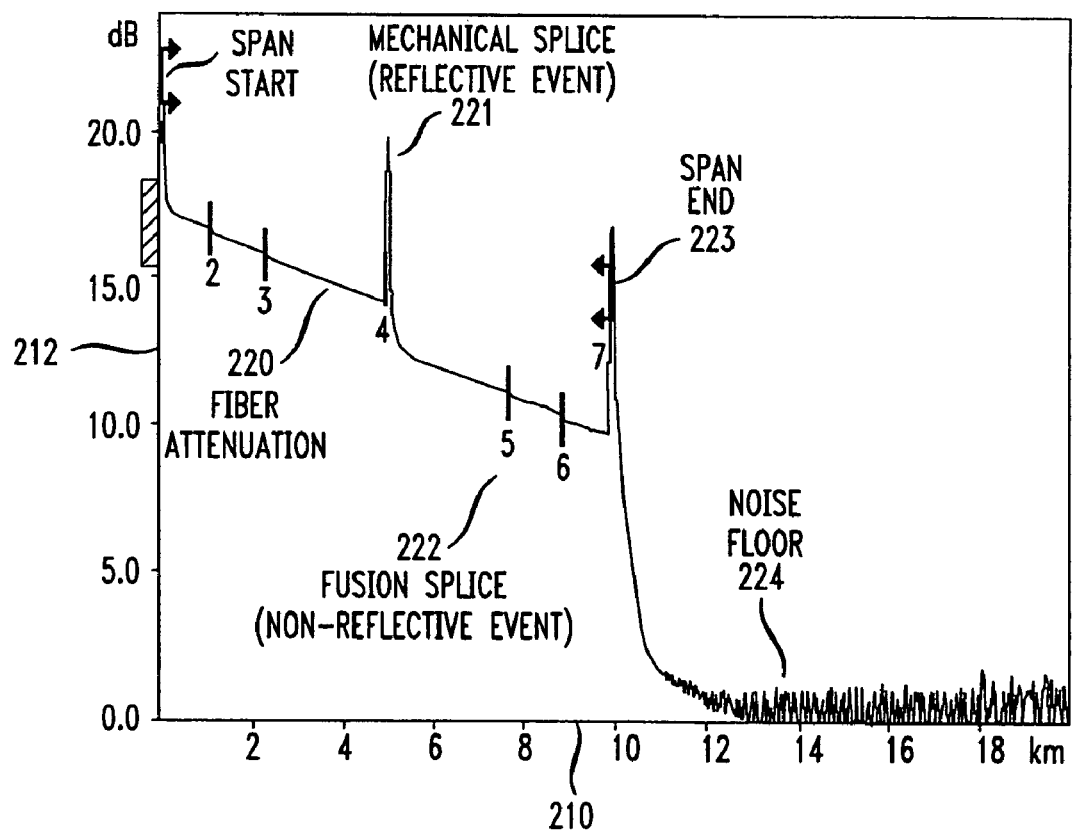
FIG. 2 is a sample graphical output from an OTDR system.

The gross distance or length values are computed by determining the location along the fiber of the span end spike. For example, in the trace shown in FIG. 2, the fiber has a length value of approximately 10 km to the span end 223. The spike at the span end is often fairly well defined in the trace because it appears as a Fresnel reflection of the glass/air interface of a polished fiber end.

The array parameters R[ ], GL[ ], IL[ ] and DV[ ] are arrays containing values for a given characteristic at a plurality of points along the fiber optic cable.

Figure 4:
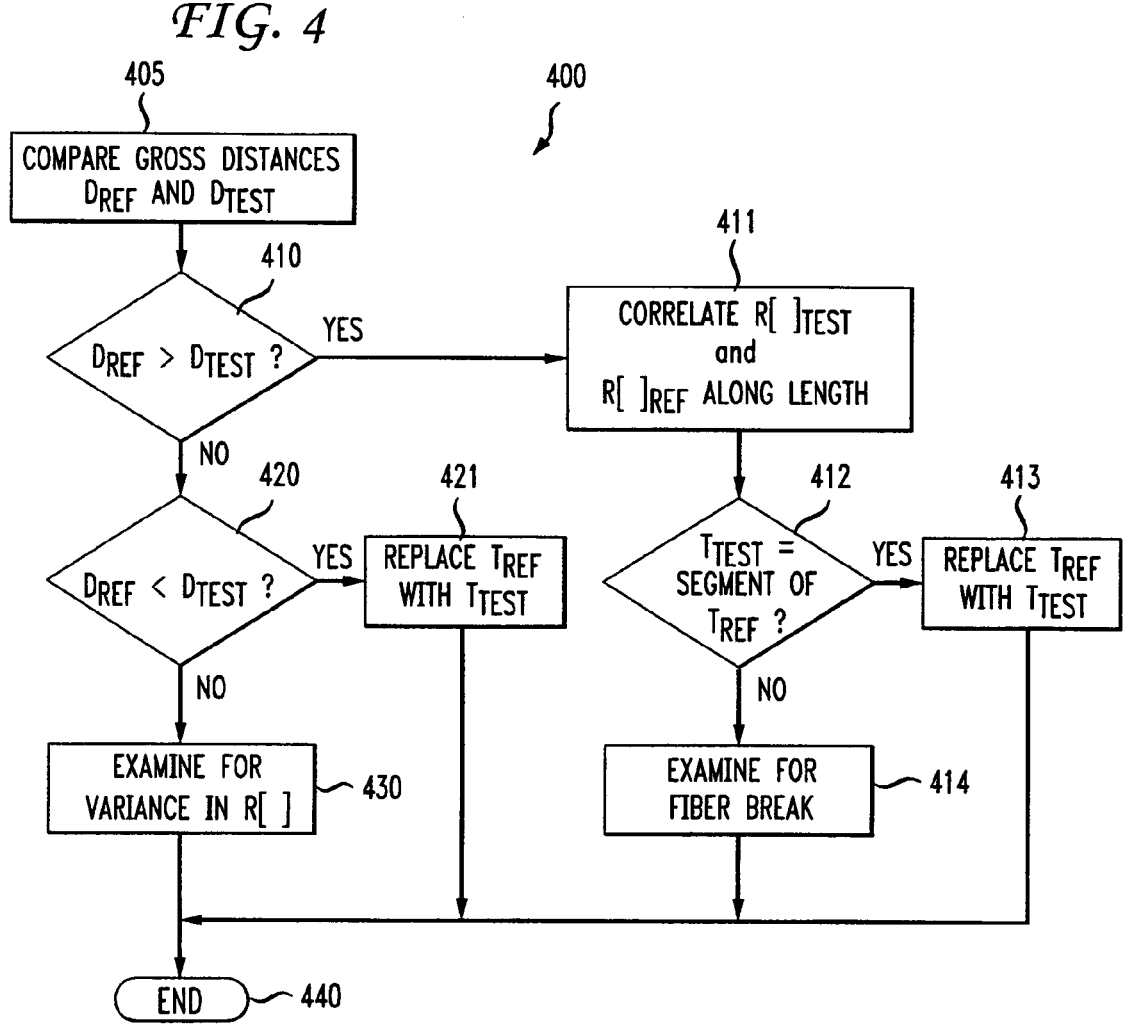
FIG. 4 is a flow chart depicting a method according to an embodiment of the invention.

In a method of the invention 400, shown in FIG. 4, the gross distance, or length, calculated from the test trace is compared (step 405) to the gross distance calculated from the reference trace.

In comparing values such as fiber length for equality or inequality, an experimental error (σ) may be taken into account. A reading of D implies an actual value of |D+/−σ|. So, to compare D$_1$ and D$_2$, the following multi-valued logic must be used:

D$_1$+2σ<D$_2$: D$_1$ is definitely less than D$_2$

D$_1$>D$_2$+2σ: D$_1$ is definitely greater than D$_2$

D$_1$<D$_2$<D$_1$+2σ: D$_1$ and D$_2$ may or may not be equal

Determinations of equality and relative magnitude made in the presently described method are preferably made using a similar multi-valued logic. A value of the experimental error σ may be calculated from the measurement data, or may be estimated based on past performance.

Based on the relative calculated values for the gross distance D$_{test}$ of the test trace T$_{test}$ and the gross distance D$_{ref}$ of the reference trace T$_{ref}$, three possible scenarios exist; each of those scenarios is examined separately in a preferred method according to the invention.

The case (decision block 420) in which D$_{ref}$<D$_{test}$ is the most straightforward case. If the test trace identifies a longer fiber length, then the test trace is adjudged to be superior to the existing reference trace, the assumption being that the only possible explanation is the (intentional) physical installation of additional cable. In that case, the reference trace T$_{ref}$ may be replaced (step 421) with the test trace T$_{test}$, which is determined to be more current.

Still, a χ$_2$ (chi-square) standard deviation test (not shown) on T$_{ref}$ versus the initial length-matched portion of T$_{trace}$ can be performed. That additional test gives a confidence factor in the test trace; a failure indicates the trace is likely invalid.

Another possible case is the case (decision block 410) where D$_{ref}$>D$_{test}$. That is a more complex case. While the underlying network has undisputedly changed, it is necessary to determine whether the new (shorter) cable more or less functional. The cable may be optically shorter due to an accidental cut or partial failure (negative impact). Conversely, a loop or splice section may have been removed intentionally during maintenance (neutral/positive impact). Essentially, the technique attempts to discover which is a more accurate picture of the desired network—$T_{ref}$ or $T_{test}$.

To establish which of the above alternatives is most likely, the following assumption is made: if the section missing from the newer (test) trace lies between both endpoints, then the change is assumed intentional. Stated conversely: an accidental cut will cause a discontinuity between the endpoints of a cable, whereas maintenance operations preserve end-to-end continuity.

Given that assumption, it is possible to determine the cause of the length discrepancy by establishing a correlation (step 411) between the fiber characteristics of various sections of $T_{ref}$ and $T_{test}$. An attempt is made to make both a positive correlation (the missing section is definitely at the far end, indicating a likely fiber cut) and a negative correlation (the missing fiber is definitely not an endpoint, indicating a maintenance-related intentional shortening).

A positive correlation can be tested (step 412) by one of several inferential statistical methods. Essentially, a two-tailed hypothesis test is desired, with null hypothesis $T_{test}$= (segment of) $T_{ref}$. The significance level ($\alpha$) of the match can be tuned by application and situation.

For instance, a chi-squared best fit can be performed against R[ ]$_{test}$ and the initial length-matched portion of R[ ]$_{ref}$. A successful test indicates $T_{ref}$ as valid; in practice, such a result would indicate a likely fiber break (step 414). A failure leads us to reject the null hypothesis and assume $T_{test}$ to be superior (step 413).

In the absence of data for R[ ] (i.e. a fiber section either without splices, or with a very small sample set of splices), the same correlations can be performed on GL[ ] and IL[ ], though a correspondingly higher confidence factor must be chosen.

If the relative magnitude of $D_{ref}$ and $D_{test}$ cannot be resolved within statistical bounds, and the optical path length remains statistically unchanged, there are still opportunities for extracting data on the relevance of $T_{ref}$ by examining for variance in R[ ] (step 430) before completing the method (step 440). Any statistically significant variance in R[ ] yields the conclusion that the reference trace is dated. Variances in GL[ ] or IL[ ] are less meaningful, but may still trigger an exception if a preset value is exceeded.

If, through any of the above statistical determinations, the test trace is adjudged superior, various possibilities exist for remedial action. An alarm condition can be suppressed, the existing reference can be automatically replaced with the new trace, or the operator(s) can be alerted to take manual action. The actual action taken by the system is application—and condition—dependent.

In situations where the reference trace is superior, there still exists the opportunity to extract meaningful data from a statistical comparison of the traces. In an alarm condition, a one-sample z-test on IL[ ]test will determine whether the alarm is most likely due to a point fault (line cut or equipment failure) or a cumulative fault (degraded signal at multiple points). A chi-squared standard deviation computation between $T_{ref}$ and $T_{test}$ will give a confidence factor for the alarm itself, with the opportunity to suppress possibly spurious alarms.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the processor performing the statistical calculations included in the method of the invention is disclosed to be a separate unit form the OTDR unit, those units may be integrated. Further, the specifically-described statistical techniques may be replaced with other known techniques. For instance, chi-squared best-fit technique may be replaced by least square or a regression fitting technique. It is to be understood that the embodiments shown and described herein are only illustrative of the principles of the present invention and that various modifications may be implemented by those skilled in the art without departing from the scope and spirit of the invention.

What is claimed is:

1. A method for updating a reference trace of reflective characteristics in an optical fiber, the reference trace being stored in a memory, the method comprising the steps of:
   receiving parameters from a test OTDR trace $T_{test}$ of the optical fiber;
   retrieving from the memory parameters from a reference OTDR trace $T_{ref}$;
   comparing a gross distance $D_{test}$ of the test OTDR trace $T_{test}$ with a gross distance $D_{ref}$ of the reference OTDR trace $T_{ref}$ using statistical bounds; and
   if relative magnitudes of $D_{test}$ and $D_{ref}$ cannot be resolved within statistical bounds, then
   (a) correlating reference fiber characteristics represented by an array parameter P[ ]$_{ref}$ with test fiber characteristics represented by an array parameter P[ ]$_{test}$; and
   (b) replacing the reference OTDR trace $T_{ref}$ in the memory with the test OTDR trace $T_{test}$ if there is a statistically significant variance between the array parameters P[ ]$_{ref}$ and P[ ]$_{test}$.

2. The method of claim 1, wherein the step of correlating reference fiber characteristics comprises correlating a reference array of reflectance spikes R[ ]$_{ref}$ with a test array of reflectance spikes R[ ]$_{test}$.

3. The method of claim 1, wherein the step of correlating reference fiber characteristics comprises correlating a reference array of gross loss values GL[ ]$_{ref}$ with a test array of gross loss values GL[ ]$_{test}$.

4. The method of claim 1, wherein the step of correlating reference fiber characteristics comprises correlating a reference array of instantaneous loss values IL[ ]$_{ref}$ with a test array of instantaneous loss values IL[ ]$_{test}$.

5. The method of claim 1, wherein the step of correlating fiber characteristics comprises performing a chi-squared best-fit of P[ ]$_{test}$ against a matched length of P[ ]$_{ref}$.

6. The method of claim 1, wherein the step of comparing the gross distances using statistical bounds comprises accounting for an experimental error $\sigma$.

7. The method of claim 1, wherein the step of correlating fiber characteristics uses an inferential statistical method.

8. The method of claim 6, wherein the relative magnitudes of $D_{test}$ and $D_{ref}$ are considered unresolvable if $D_{ref} < D_{test} < (D_{ref}+2\sigma)$, or if $D_{test} < D_{ref} < (D_{test}+2\sigma)$.

9. The method of claim 7, wherein the inferential statistical method includes performing a chi-squared best fit of the parameter P[ ]$_{test}$ against the parameter P[ ]$_{ref}$.

10. The method of claim 7, wherein the inferential statistical method includes a two-tailed hypothesis test with a null hypothesis $T_{test}$=(matched segment of) $T_{ref}$.

* * * * *